(No Model.)
A. APPLEBY.
DRIVE CHAIN FOR CYCLES.
No. 589,683.　　　Fig. 1.　　Patented Sept. 7, 1897.
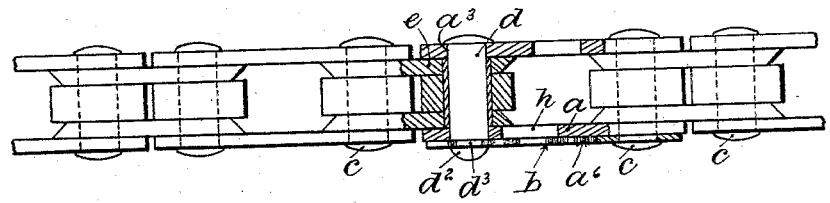
Fig. 2.
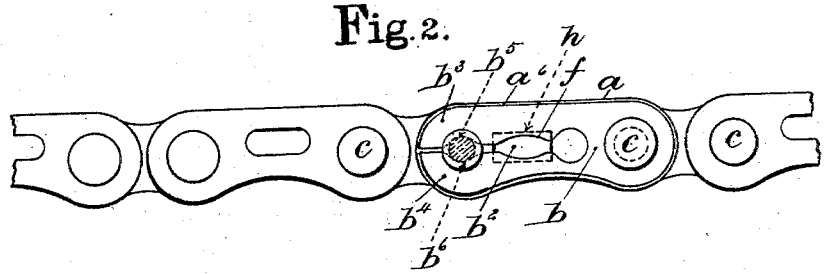
Fig. 3.
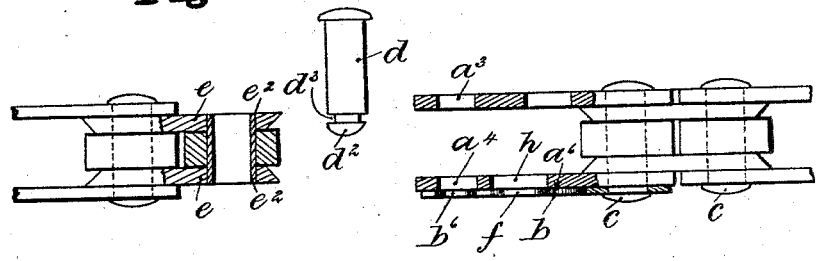
Fig. 5.　　　Fig. 4.
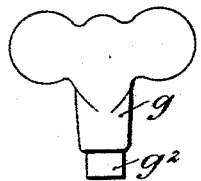
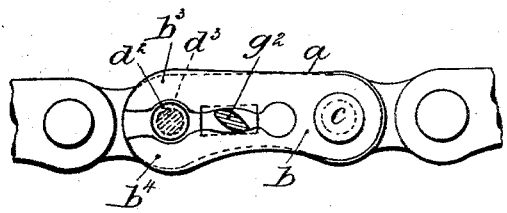
Witnesses　　　　　　　　Inventor
Geo Lucey　　　　　　　　Alfred Appleby
A E Biddle

UNITED STATES PATENT OFFICE.

ALFRED APPLEBY, OF BIRMINGHAM, ENGLAND.

DRIVE-CHAIN FOR CYCLES.

SPECIFICATION forming part of Letters Patent No. 589,683, dated September 7, 1897.

Application filed June 10, 1897. Serial No. 640,185. (No model.)

*To all whom it may concern:*

Be it known that I, ALFRED APPLEBY, a subject of the Queen of Great Britain, residing at Birmingham, in the county of Warwick and Kingdom of England, have invented certain new and useful Improvements in Drive-Chains for Cycles, of which the following is a specification.

This invention relates to improvements in drive-chains for cycles and other chain-geared vehicles and machines, and has for its object to provide a simple and effective joining-up or connecting means whereby the respective links at the free ends of a length of drive-chain are coupled together and an endless drive-chain formed.

My invention is also such that the joining-up links of the endless chain can be separated or detached at any time in a very simple and expeditious manner. The said joining-up means consist, essentially, of two parts, one a metallic thin spring-plate, one end of which is formed into two gripping-jaws and provided with pierced parts to form a gate or entrance to the said jaws, and the other a circular-ended joining-up pin or bolt with a groove or neck inward of its rounded end. This thin spring-plate, which is made of any suitable shape, is attached to the outside face of one of the outer or joining-up links of the drive-chain by being riveted up with one of the cross-rivets and is so arranged that the gate or entrance to the two spring-jaws at the opposite end comes coincident with the joining-up cross-holes of the said links. The joining-up pin or bolt is designed with one of its ends rounded, the other end being formed with a head, and inward of this rounded end is provided a circular groove or neck into which the edges of the metal of the spring-jaws of the steel plate before described take to prevent the withdrawal of the pin.

To more fully illustrate the invention, I attach hereto a sheet of drawings, in which—

Figure 1 is a plan view, partly in section, of a piece of drive-chain provided and fitted with my improvements. This figure shows the ends of the chain connected or joined up by the cross pin or bolt and the latter securely locked in its engaged position by the locking-plate. Fig. 2 represents a side elevation of Fig. 1, and this view and the previous one clearly illustrate the thin spring locking-plate and also its connection and attachment to one of the links of the drive-chain, the construction of the latter being upon the twin-roller principle. Fig. 3 sets forth a like view to Fig. 1, but with the respective ends of the drive-chain shown disconnected, while Fig. 4 shows a similar view to Fig. 2, but with the jaws of the locking-plate opened for the withdrawal of the cross pin or bolt by means of a key. (Shown in Fig. 5.)

The same letters of reference indicate like parts in the whole of the figures in the sheet of drawings.

The drive-chain is built up of pairs of inner and outer links connected together by cross pins or rivets upon which are mounted rollers according to the "twin-roller" principle. Upon the outside face $a^6$ of one of the outer links $a$ of the outer joining-up pair is attached, by being connected to the cross-rivet $c$, a thin steel plate $b$ of a shape somewhat alike unto the link itself. The one end of this thin steel plate $b$ is slit at $b^2$ for about three parts of its length, forming the greater part of it into two spring gripping-jaws $b^3$ $b^4$, having semicircular parts $b^5$ $b^6$, which combine to form a gate or entrance for the passage of the locking pin or bolt. A middle piercing $f$ is fashioned within the locking-plate $b$ for the reception of the elliptical-shaped end $g^2$ of a key $g$, by which latter the spring-jaws $b^3$ $b^4$ are forced open or apart to enable the withdrawal of the connecting bolt or pin.

The joining-up pin $d$ is fashioned with one of its ends $d^2$ rounded and of the same diameter as the pin-body, but inward of this rounded end is a groove or neck $d^3$, wherein the edges of the gate or entrance of the spring-plate $b$ engage to hold the said joining-up pin in a locked position.

The inner joining-up links $e$ of the chain have cross-holes $e^2$ through them, as also have the outer links, as before described, and when the inner links are in position inside of the outer links the said holes, which are marked $e^2$, $a^3$, and $a^4$, come coincident, so that the joining-up bolt or pin $d$ can be passed crosswise through and into them.

A limiting-slot $h$ is provided in the side of the link $a$ opposite to the piercing $f$ as a stop to the key $g$ to prevent the key from straining the jaws $b^3 b^4$ of the plate $b$ by opening them too far.

I wish it to be observed that the locking of the joining-up pin $d$ is automatic or self-acting, as upon the bolt $d$ being forced home into the position shown in Figs. 1 and 2 the rounded end $d^2$ of the same forces open the jaws $b^3 b^4$ of the locking-plate $b$ until the gate or entrance formed by the combined ends $b^5 b^6$ admits of the passage of the said end, but immediately the rounded end is through the gate the jaws grip into the groove or neck $d^3$ of the pin $d$ and prevent its withdrawal until the jaws are again opened by the key shown in Fig. 5.

Having now described my invention, what I claim, and desire to secure by Letters Patent, is—

1. In a drive-chain, the combination with end links having cross holes or piercings adapted to register with one another, of a locking-plate attached to one end of one of the said links and the other end of which is formed into two spring gripping-jaws, and a pivot-pin arranged to fit registering holes in the end links and provided with a rounded end and a contracted neck into which latter the edges of the spring-jaws take to normally hold the cross-pin in its joining-up position, substantially as described.

2. In a drive-chain, the combination with end links having cross holes or piercings adapted to register one with the other, of a locking-plate attached to one end of one of the said links and the other end of which is formed into two spring gripping-jaws provided with parts to form a gate or entrance and a keyhole, the said gripping-jaws being able to be forced apart to enlarge the gate, and a pintle arranged to fit registering holes in the end links to pivotally connect the latter and provided with a rounded end and a contracted neck, into which latter the edges of the spring-jaws adjacent to the gate or entrance take to normally hold the pintle in its joining-up position, substantially as described.

3. In a drive-chain, the combination with end links having cross holes or piercings adapted to register one with the other, of a locking-plate attached to one end of one of said links and the other end of which is formed into two spring gripping-jaws provided with parts to form a gate or entrance and a keyhole, the said gripping-jaws being able to be forced apart to enlarge the gate, a pivot-pin arranged to fit registering holes in the end links and provided with a rounded end and a contracted neck, into which latter the edges of the spring-jaws adjacent to the gate take to normally hold the cross-pin in its joining-up position, a limiting slot or piercing within the link to which the locking-plate is attached and adjacent to the keyhole thereof, and a key adapted to fit the said keyhole and locking-plate and to extend into limiting-slot, substantially as described.

In testimony whereof I have signed this specification in the presence of two subscribing witnesses.

ALFRED APPLEBY.

Witnesses:
GEO. AVERY,
ALFRED FRANK BIDDLE.